No. 803,659. PATENTED NOV. 7, 1905.
A. S. ALLEN.
PNEUMATIC TIRE.
APPLICATION FILED NOV. 12, 1904.

Witnesses:
Fred S. Greenberg
S. Wm. Lutton

Inventor.
Arthur S. Allen,
by Crosby Gregory
Attys.

UNITED STATES PATENT OFFICE.

ARTHUR S. ALLEN, OF BROOKLINE, MASSACHUSETTS.

PNEUMATIC TIRE.

No. 803,659. Specification of Letters Patent. Patented Nov. 7, 1905.

Application filed November 12, 1904. Serial No. 232,412.

*To all whom it may concern:*

Be it known that I, ARTHUR S. ALLEN, a citizen of the United States, and a resident of Brookline, in the county of Norfolk and State of Massachusetts, have invented an Improvement in Pneumatic Tires, of which the following description, in connection with the accompanying drawings, is a specification, like letters on the drawings representing like parts.

This invention has for its object the production of a novel wheel-tire for use with automobiles, bicycles, and the like. Heretofore many attempts have been made to render india-rubber tires puncture-proof, and for this purpose both wire and sheet metal have been combined with the body of the tire in various ways.

In accordance with my invention I have produced a puncture-proof tire possessing great strength and resiliency by incorporating with the body or tread of the tire a flexible fabric composed of laterally-intermeshed wire coils held together, preferably, by locking means extended longitudinally through the intermeshed portions and uniting each pair of wire coils, the interstices of the wire coils having a filling composed in whole or in part of india-rubber or equivalent material, capable of being vulcanized.

The intermeshed or united wire coils to be embodied within the tire in layers are preferably twisted right and left and are intermeshed one coil with the adjacent coil by forcing one coil laterally into meshing engagement with the other coil, and to secure the greatest strength and durability for the tire containing these wire coils I prefer to have, as shown, the wire coils arranged transversely or diagonally with relation to the length of the tire rather than in the direction of the circumference of the tire. One or a plurality of layers of these wire coils may be vulcanized in the body or tread of the tire, and the individual wire coils of each layer will preferably run diagonally with relation to the wire coils of another layer, yet this is not absolutely essential so long as the wire coils occupy a position crossing the length of the tire.

Figure 1:
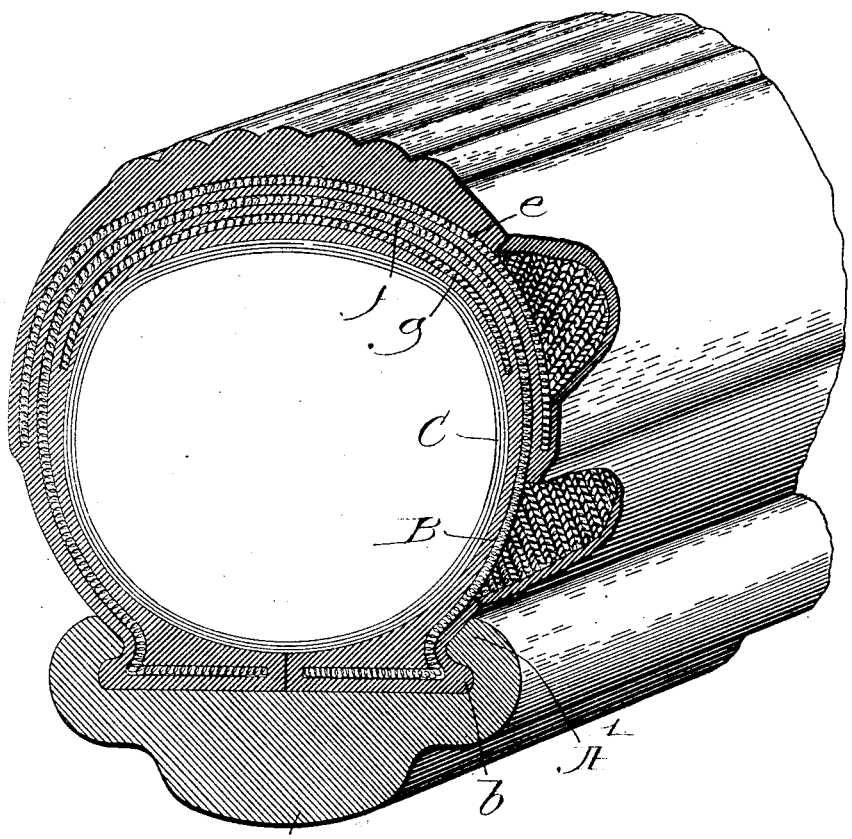
Figure 2:
Figure 3:
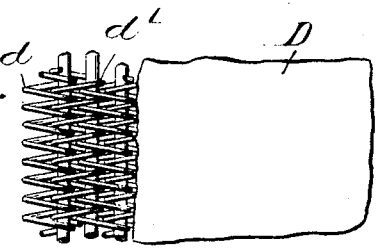

Figure 1 in perspective shows part of a wheel-rim and a section of tire provided with intermeshed wire coils in accordance with my invention, portions of the tire being broken out to show the diagonal trend of the different layers of wire coils; Fig. 2 in section shows some wire coils intermeshed and united by the locking means extended longitudinally through the intermeshed edges thereof and also the interstices of the wire coils supplied with filling, and Fig. 3 is a plan view of Fig. 2 with part of the filling omitted to illustrate the intermeshing of the edges of the right and left wire coils.

The rim A, having a lip A' to be engaged by the hooked edges $b$ of the body of the tire B and the inner inflatable tube C, are and may be all, as usual, the particular shape of the tire in cross-section, and the particular manner of attaching the tire to the wheel-rim not being essential any usual means of attaching the same may be employed.

My improvements relate wholly to providing the body or tread of the tire with laterally-intermeshed wire coils locked together as described, the interstices of the wire coils receiving a filling to prevent undue stretching or crushing of the individual wire coils.

The fabric D, composed of a series of wire coils $d\ d'$, formed by twisting the wires preferably into right and left wire coils are laid side by side and intermeshed one with the other (see Fig. 3) by shoving the side of one coil into the side of the other coil by a lateral movement of one coil with relation to the other. After this the intermeshed wire coils are united by a locking means inserted through the intermeshed edges of the adjacent wire coils, the locking means extending longitudinally of the wire coils and being preferably composed of fibrous material, such as linen or cotton, or spring-wire. The interstices of these wire coils, intermeshed and locked together as described, receive a filling, preferably of india-rubber or equivalent material, that may be vulcanized after being applied to the interstices of the wire coils. The filling may be applied either before the wire coils are laid into the rubber to form the body of the tread or the interstices may receive the filling during the manufacture of the tire on the former, it being understood that the body or tread of the tire will be produced by usual means and in usual ways.

It will be understood that the individual wire coils extend across the fabric in the direction of its width and that coil after coil may be intermeshed and united by the locking means, thus producing a wire-coil fabric of any desired length. When the individual wire coils are to extend transversely of the length of the wire-coil fabric, so as to stand diagonally in the tire, the individual wire coils may be laid in a position so that they will stand diagonally with relation to the length of the fabric to be made, it being possible to readily lock or unite the wire coils after they are intermeshed, so that the individual wire coils will stand at right angles to the length of the fabric or diagonally with relation thereto. Where the individual wire coils extend crosswise the length of the fabric, it will be understood that the ends of the wire-coil fabric may be readily united by simply intermeshing one with the other the endmost wire coils of the strip of fabric to be united in circular form in the tire, and a locking-strand may then be inserted to confine the strip in circular form.

Usually in making up tires a sheet of india-rubber of the desired thickness will be applied to a former having a shape exteriorly in cross-section corresponding with the shape of the tire to be made, and the wire coils intermeshed, as described, to form a layer of wire coils long enough to extend about the former and the rubber thereon and having filling applied in the interstices of the wire coils, which filling may be in a green state, will be applied to the india-rubber on the former, and the ends of the strip of wire coil will be united.

In some instances I may prefer to apply the intermeshed and locked wire coils directly to the india-rubber laid on the former and then lay upon the wire coils a layer of india-rubber to constitute the filling, and then I may lay thereon one or more layers of india-rubber varying in thickness according to the amount of india-rubber it is desired to put into the tire. Over this layer of india-rubber I may apply another layer of wire coils, and so on, building up the thickness of the tire by the addition of rubber and wire coils, as may be desired, leaving the face of the tire outside the last layer of wire coils of any desired thickness, and then the entire mass is vulcanized in any usual way.

Fig. 1 shows three layers $e\ f\ g$ of wire coils in the body of the tread of the tire. The connected intermeshed wire coils in the exterior layer of wire coils marked $e$ are extended across the wire diagonally or transversely the length of the tire, as shown, while the wire coils of the layer of wire coils $f$ are shown as so inclined across the width of the tire as to cross the individual wire coils of the layer $e$ of the wire coils. The layer $f$ is shown as extended entirely across the tire into the edges of the tire to be attached to the rim, the extension of the springs or flexible wire coils composed of spring-wire of small gage into the edges of the tire preventing the breaking off or cracking through of the parts of the tire that coact with the usual rim or parts confining the tire to the rim. The individual coils of the third layer of wire coils $g$ are also extended across the tire in the direction of its width.

One or more layers of intermeshed wire coil locked as described may be arranged in a body of india-rubber made as shown and adapted to be applied to the exterior of an ordinary india-rubber tire, substantially as provided for in United States Patent No. 755,310. The interposition of the wire coils of small diameter, the interstices of which are filled with a filling, will substantially resist the entrance of a tack into the body of a tire, as it is impossible for a tack or other sharp thing to cut through the spring-steel wire with the coils substantially close together and intermeshed as the tire is being run over a road. Further, the employment in a tire of wire coils arranged in a fabric such as described adds greatly to the resiliency of the tire and aids in maintaining the tire in the condition in which it will be held by the inner tube when inflated, or in other words, the intermeshed wire-coil strips applied as described to the tire supplements the action of the inner tube and counteracts any tendency to the deflation or knocking in of the tire at any point.

Having fully described my invention, what I claim as new, and desire to secure by Letters Patent, is—

1. A tire comprising a body of india-rubber containing a layer of intermeshed oppositely-wound united wire coils embedded therein, the coils crossing said body transversely of its length.

2. A tire composed of a body of india-rubber containing a series of intermeshed oppositely-wound wire coils the wire at the side of one coil entering the spaces between the wire of a contiguous coil thus intermeshing the coils, and locking means extended through said intermeshed wire coils and holding the coils in intermeshed condition.

3. A tire provided with a plurality of layers of intermeshed wire coils, means for retaining the wire coils intermeshed, the wire coils of each layer of fabric crossing the tire transversely, the individual wire coils of one layer crossing the individual wire coils of the other layer.

In testimony whereof I have signed my name to this specification in the presence of two subscribing witnesses.

ARTHUR S. ALLEN.

Witnesses:
GEO. W. GREGORY,
MARGARET A. DUNN.